United States Patent [19]
Moen

[11] 3,726,316
[45] Apr. 10, 1973

[54] FAUCET CONSTRUCTION

[76] Inventor: Alfred M. Moen, 25 Lakeview Drive, Grafton, Ohio 44044

[22] Filed: May 27, 1971

[21] Appl. No.: 147,327

[52] U.S. Cl. .............................................. 137/625.17
[51] Int. Cl. ............................................... F16k 11/02
[58] Field of Search .................. 137/625.17, 454.2, 137/636.4; 251/282

[56] References Cited

UNITED STATES PATENTS

| | | | |
|---|---|---|---|
| 3,103,231 | 9/1963 | Moen | 137/625.17 X |
| 3,202,181 | 8/1965 | West | 137/636.2 X |

*Primary Examiner*—Henry T. Klinksiek
*Attorney*—Parker, Plyer & McEachran

[57] ABSTRACT

A single handle mixing faucet has a hollow stem positioned within a sleeve. The sleeve has a pair of water inlet openings and at least one discharge opening and the stem is reciprocal and rotatable relative to the sleeve to control the volume and temperature of water discharged from the sleeve. The sleeve is positioned within a retainer having bottom inlet openings with the exterior of the sleeve and the interior of the retainer cooperating to define passages from the retainer inlet openings to the sleeve inlets. A handle for the mixing faucet includes a cap and a lever, with the cap being attached to a stem and a portion of the lever being positioned within the cap and interlocked with the sleeve.

24 Claims, 14 Drawing Figures

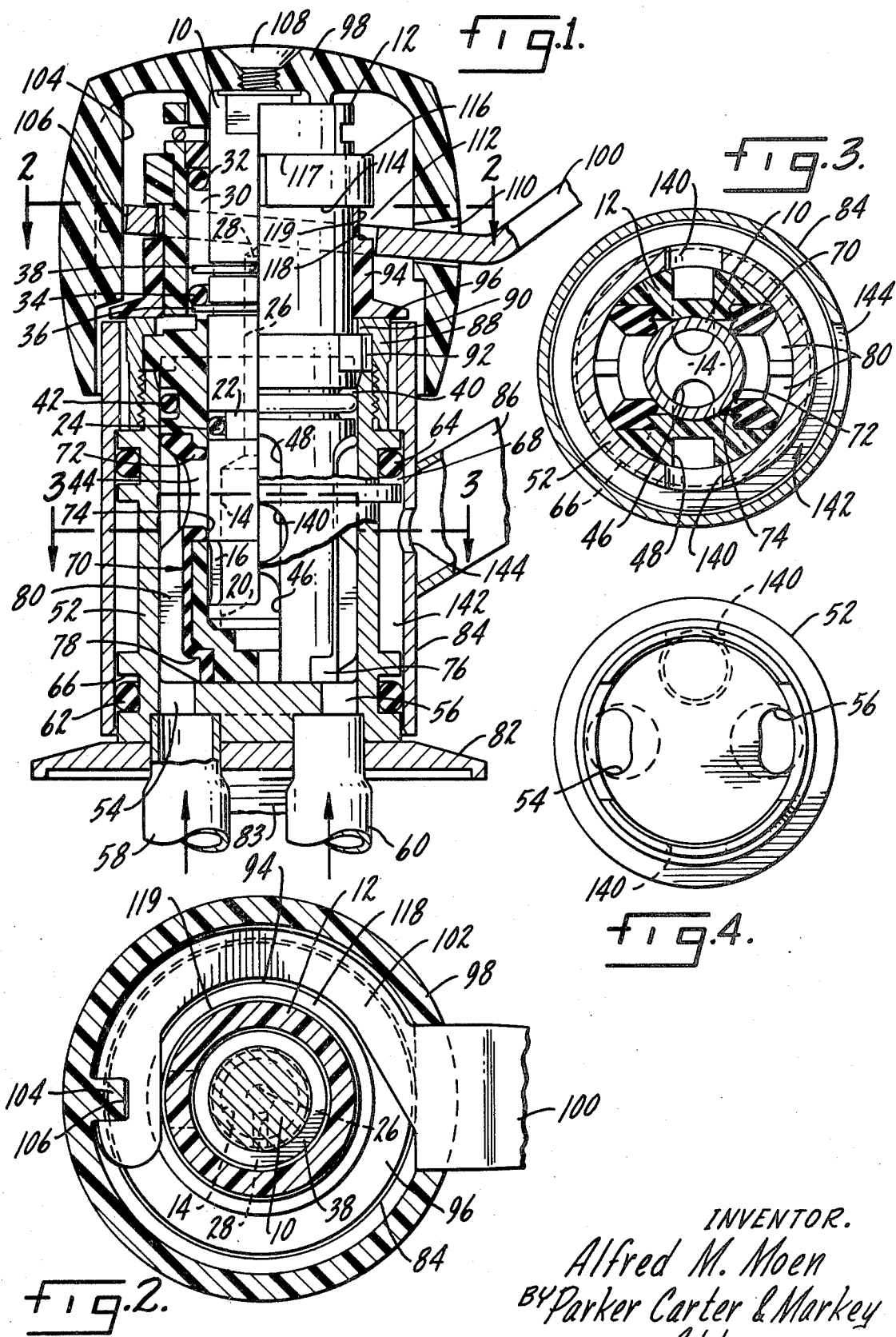

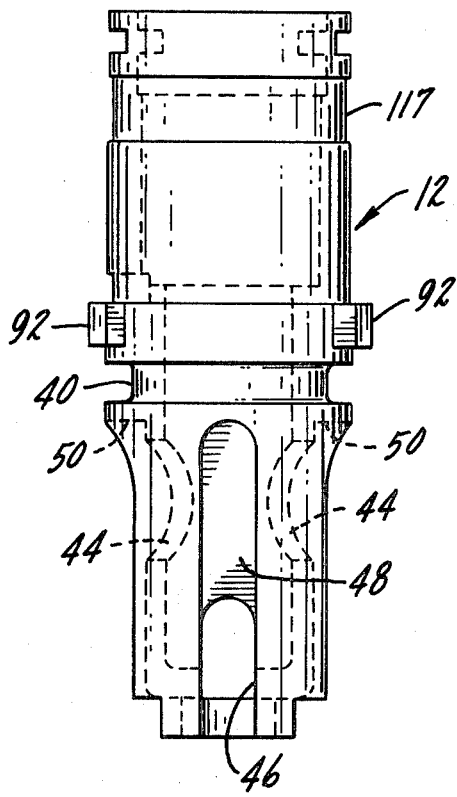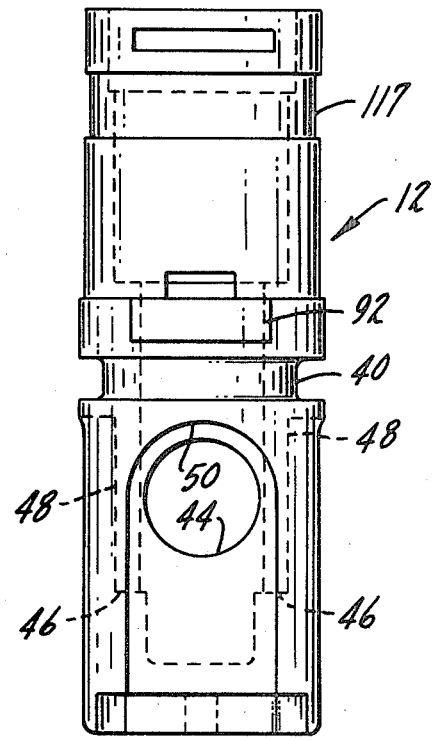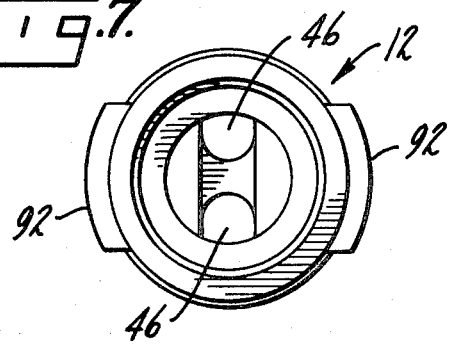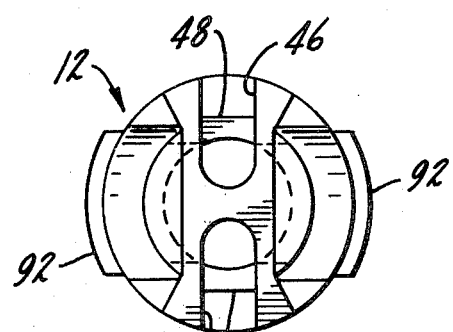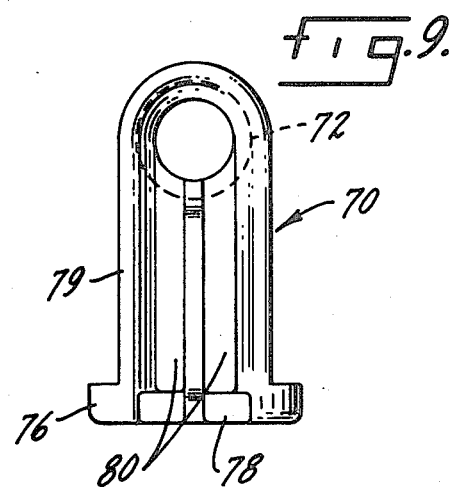

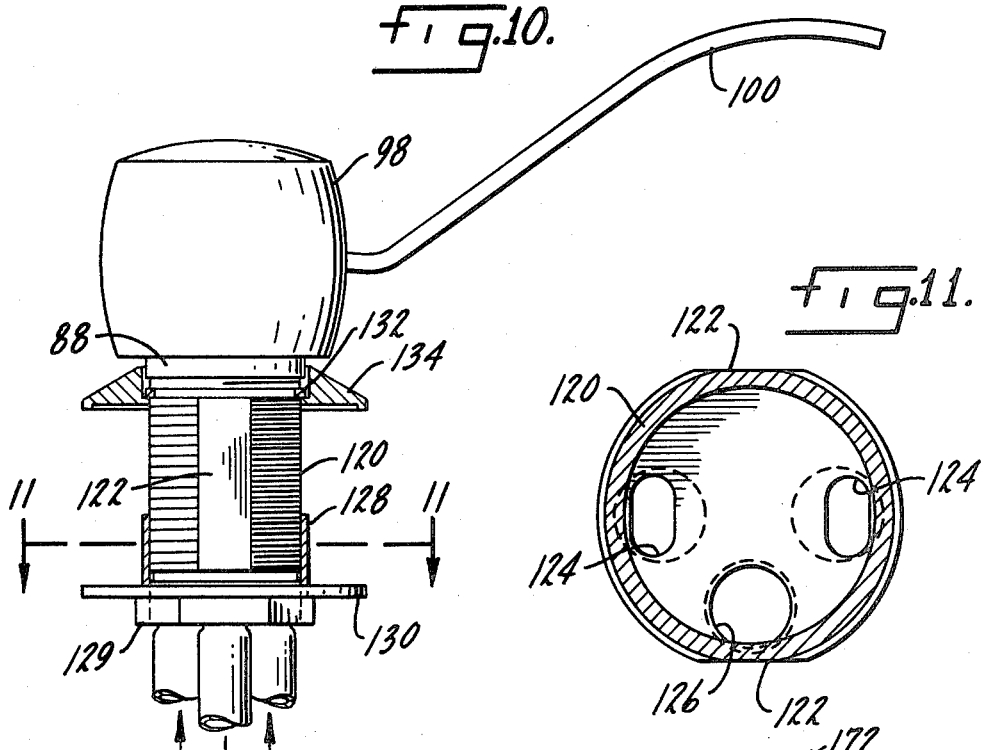

FAUCET CONSTRUCTION

SUMMARY OF THE INVENTION

The present invention relates to improvements in single handle mixing faucets and in particular to a compact, reliably constructed mixing faucet.

A primary purpose of the invention is a mixing faucet in which the control valve made up of a stem and sleeve are positioned within a retainer having bottom inlet openings and in which the interior surface of the retainer cooperates with sleeve seals to define passage means connecting the retainer inlets and the sleeve inlets.

Another purpose is a mixing faucet of the type described suitable for use either in a faucet construction having a spout attached to the valve or in a faucet construction in which the spout is remote from the valve.

Another purpose is a mixing faucet in which the valve sleeve has a pair of side inlet openings and at least one discharge opening.

Another purpose is a single handle mixing faucet including an improved interconnection between the cap and lever.

Another purpose is a mixing faucet of the type described in which the lever and cap are relatively easy to assemble.

Another purpose is a single handle mixing faucet of the type described including an improved interconnection between the lever, cap and valve member.

Another purpose is an improved seal for a mixing faucet of the type described.

Another purpose is a single handle mixing faucet in which assembly of the valve member within the retainer can be accomplished without passing a seal member past an opening in the retainer.

Another purpose is a faucet mixing valve which can be used in a kitchen, lavatory or shower-tub combination.

Another purpose is a mixing valve which can be used in a machined casting rather than a cored casting.

Other purposes will appear in the ensuing specification, drawings and claims.

BRIEF DESCRIPTION OF THE DRAWINGS

The invention is illustrated diagrammatically in the following drawings wherein:

FIG. 1 is an axial section, with portions broken away for clarity, illustrating one form of single handle mixing faucet, FIG. 2 is a section along plane 2—2 of FIG. 1, FIG. 3 is a section along plane 3—3 of FIG. 1, FIG. 4 is a top plan view of the receiver, FIG. 5 is a side view of the valve sleeve, FIG. 6 is a side view, taken in a plane 90° from the plane of FIG. 5, FIG. 7 is a top view of the valve sleeve, FIG. 8 is a bottom view of the valve sleeve, FIG. 9 is a side elevation of one of the seal members, FIG. 10 is a side view of a modified form of single handle faucet, FIG. 11 is a section along plane 11—11 of FIG. 10, FIG. 12 is a partial section, similar to FIG. 1, showing a modified form of the invention, FIG. 13 is a top plan view of the seal of FIG. 12, and FIG. 14 is a bottom plan view of the seal.

DESCRIPTION OF THE PREFERRED EMBODIMENT

In FIG. 1 a valve stem 10 is mounted for rotation and reciprocation within a valve sleeve 12. The stem is hollow and includes a mixing chamber 14 and a pair of inlet openings, one of which is indicated at 16. The inlet openings may vary in size and shape to provide greater rotation of the stem within the so-called comfort zone as disclosed in U. S. Pat. No. 3,428,088. A divider, not shown, may be positioned within the mixing chamber 14 to prevent cross flow between the hot and cold water inlets and to prevent noise. The bottom of the stem 10 is open to define a discharge opening 20 so that the combined hot and cold water from the inlet may flow outwardly from the stem. The stem may include an annular groove 22 containing an O-ring 24 which seals the exterior of the stem and the interior of the sleeve 12 to prevent the seepage of water upwardly toward the handle.

The stem 10 may include an upwardly directed water passage 26 which is in communication with an opening 28 conveying water to a balance chamber 30 at the upper end of the stem. Balance chamber 30 is defined by upper O-ring or seal 32 and a lower O-ring or seal 34. A pair of snap rings 36 and 38 positioned in grooves on the exterior of the stem confine movement of seal 34. The valve shown herein is balanced in the same manner as the valve shown in my prior U.S. Pat. Re. 25,920. In the open position there is an upwardly directed force component caused by water pressure upon the entire cross section of the stem 10. The downwardly directed force component is caused by water pressure on the sealing area of seal ring 34. The sealing area of ring 34 is generally equal to the cross sectional area of the stem, thus providing a balanced stem and one which will remain in any open or closed position and not move due to differential water pressures.

The exterior of the sleeve 12 includes an annular groove 40 containing a seal ring 42 which prevents water seepage in an upward direction. As illustrated in FIGS. 5–8, the sleeve has a pair of generally diammetrically opposed inlets 44 and a pair of outlets 46, again diammetrically opposed and positioned generally midway between the inlets. At each of the outlets 46 there is an elongated slot 48 with the outlets being positioned generally at the bottom of the slot. The slots 48 may convey water upwardly when there is a spout configuration, as shown in FIG. 1, or the water may be discharged downwardly out of the bottom opening 46 in the construction shown in FIGS. 10 and 11. Grooves 50 are formed in the sleeve exterior surface adjacent each of the inlets 44.

The valve construction described above consisting of the stem and the sleeve is positioned within a generally cylindrical retainer 52, the bottom of which may have a pair of openings 54 and 56 to convey hot and cold water toward the valve member. Conduits 58 and 60 are indicated in FIG. 1 and are connected in alignment with the bottom inlet openings 54 and 56 in the retainer. The exterior of the retainer may include seal rings 62 and 64 positioned within circumferential grooves 66 and 68. Seal members 70 are positioned within grooves 50. Each of the seal members 70 includes an inwardly directed ring-like portion 72 which extends within the inlet openings 44 and has an inwardly directed edge 74 which seals against the valve stem 10. The exterior of each seal 70 includes spaced passages 80, with sides 79 outside of the passages 80 bearing against the interior of the retainer 52. At the lower end of the seal 70 there are feet 76 which sit upon the bottom surface of the retainer 52. There are ports 78 in the bottom of each seal member 70 with the ports 78 opening into the spaced passages 80. Thus, the interior of the retainer and seal members 70 cooperate to define water inlet passages to convey water between the inlets 54 and 56 and the inlets 44. The seal members 70 are effective to not only seal the area around the inlets 44, but prevent cross flow of water between the inlet passages 80.

The retainer 52 may seat upon a base or escutcheon 82 and a spout hub 84 may be positioned about the retainer. Spout hub 84 may mount a spout 86 as is conventional in a kitchen-type faucet construction. A holddown stud 83 is attached into the bottom of the retainer, passes through escutcheon 82, and secures the faucet into the sink top.

A nut or the like 88 is threaded onto the upper end of the retainer 52 and has an inwardly directed flange 90 which overlies the upper end of the valve sleeve, thus joining the sleeve and the retainer. The sleeve may have a pair of outwardly directed projections 92, illustrated in FIG. 7, which fit within mating grooves at the upper end of the retainer to properly align the retainer for insertion of the sleeve and stem. Seated on top of nut 88 is a cap 94 which has an outwardly directed flange 96 overlying a portion of the spout hub 84. The cap 94 is formed on its interior surface to closely fit the valve sleeve 12.

The handle for the faucet in FIG. 1 includes a cap 98 and a lever 100. The lever 100 has a portion 102 which fits within the cap and is illustrated in FIG. 2. A key is formed in the interior surface of the cap and, as indicated at 104, there is a keyway 106 formed adjacent one end of the generally semicircular portion 102 of the lever which fits within the cap. Thus, the cap and the lever are joined together for simultaneous rotation through the interlock of the key 104 and the keyway 106. The cap 98 may be attached, by means of a screw or the like 108, to the upper end of the stem 10. The lever 100 passes through an opening 110 in the cap 98 and the semicircular lever portion 102 is interlocked with the sleeve 12 by groove 112. The groove 112 is formed by the lower surface 114 of a snap ring 116 positioned in a sleeve groove 117 and by an outwardly extending shoulder 118 which is formed by the bottom of a groove 119 at the upper end of the cap 94. Thus, the upper end of the cap 94 and snap ring 116 cooperate to define a groove and at least a portion of the handle 102 is positioned therein to control reciprocal movement of the stem relative to the sleeve.

The construction of FIGS. 10 and 11 is substantially the same as that shown in FIGS. 1-9, except that the retainer, indicated at 120, is exteriorly threaded and has two flats 122. The bottom of the retainer has two inlet openings 124 and a discharge opening 126. The construction of FIGS. 10 and 11 would be adaptable for use with a remote spout, such as in a shower-tub combination, or a lavatory combination in which the control valve is spaced from the water discharge. A sleeve 128 is threaded onto the exterior of the retainer 120 and may be integral with a nut 129. A washer 130 may fit over sleeve 128. The upper end of the retainer 120 may be attached by a snap ring or the like 132 to a cover 134. The handle and lever may be the same, as illustrated above.

Water is directed to the valve through the conduits 58 and 60, flowing upwardly through the passages 80 defined by the seal 70 and the interior of the retainer to the sleeve inlet ports. Rotation of the lever 100 and the cap 98 will rotate the stem within the sleeve and thus vary the position of the stem inlets 16 relative to the sleeve inlets. Reciprocation of the handle will move the stem up and down relative to the sleeve and upward movement will move the inlets 16 to a point where they are at least in partial register with the sleeve openings to admit hot and cold water into the mixing chamber 14. As shown in FIG. 1, water will flow out of the discharge openings 46 and upwardly along slots 48 to reach discharge ports 140 in the retainer sides. There may be a pair of such discharge ports in the retainer, generally diammetrically opposed and in alignment with the slots 48 in the exterior of the sleeve. From the discharge ports 140 water will pass to a chamber 142 defined between the outside of the retainer and the inside of the spout hub. Water will then flow out of port 144 into spout 86.

In the construction of FIGS. 10 and 11, water will flow downwardly through ports 46 and then through the discharge in the retainer bottom.

In the constructions of FIGS. 12-14, the stem 10 and the retainer 52 are the same as illustrated in FIG. 1 and have been given the same numbers. A seal 150, illustrated in detail in FIGS. 13 and 14, has a lower spherical surface 152 which seats upon an upwardly directed support 154 which may be part of the retainer or may be a separate member. The upper surface of the support 154, indicated at 156, has a spherical surface mating with the lower spherical surface 152 of the seal. The sleeve 158 has a lower surface 160 which is spherical in shape and rests upon an interior spherical surface 162 of the seal 150.

The seal 150, as illustrated in FIGS. 13 and 14, has port seal portions 164 which extend through the hot and cold water inlet ports 166 in the sleeve and are in sealing contact with the exterior of the stem. There are exterior passages 168 in the seal, which perform the same function as the passages 80 in the embodiment of FIGS. 1-11. Water flows upwardly through the openings 54 and 56 in the bottom of the retainer and through the passages 168 formed between the seal and the interior of the retainer and then to the port seal portions 164 which direct water inwardly to the stem. The exterior of the seal 150 has a plurality of spaced beads 170 and 172. Each of the beads 170 and 172 extend from the top of the seal, down the side, around the spherical bottom, and then up the other side. The beads 170 and 172 are identical, there being one on each half of the exterior of the seal 150. The beads 170 and 172 are in sealing contact with the interior surface of the retainer and the bottom spherical surface 156 of the support 154.

There are a pair of discharge openings 174 in the seal 150 which are in alignment with the discharge openings near the bottom of the sleeve 158. The sleeve discharge openings are substantially the same as illustrated in the construction of FIGS. 1-11. Water flowing out of the sleeve discharge opening flows through the openings 174 in the seal 150 and then out through ports 140 in the retainer and into the chamber 142, in the same manner as described in connection with the structure of FIGS. 1-11.

The essential difference between the structure of FIGS. 12-14 and that of FIGS. 1-11 is that the seal halves 70 have been replaced by a unitary seal which has a spherical bottom.

One advantage in the handle construction is the fact that that portion of the lever within the cap is only semicircular in form, permitting substantially reduced time in assembly. In prior faucet constructions, that portion of the lever within the cap took the form of a complete circle which necessitated a more difficult assembly operation. Also of advantage is the improved relationship between the lever and the valve sleeve. The snap ring 116 forms the upper portion of a groove containing the lever and the cap 94 forms the bottom portion of the groove.

Of importance is the relationship between the key and lever. The key guarantees centered relationship of the lever relative to the cap.

When the valve is assembled, the seal members 70 and 150 do not pass over any openings in the retainer. Proper alignment dictates that the outlet ports 140 in the retainer are 90 degrees from the inlet ports in the valve sleeve when the sleeve and stem are assembled into the retainer. Thus the seal members do not pass over any openings as they are moved into the retainer. This is important as it has been found in practice that when seal members pass over openings, if the seal members are under compression, they may pop into the openings and when further moved, the shearing effect can rip or tear the seals.

Whereas the preferred form of the invention has been shown and described herein, it should be realized that there may be many modifications, substitutions and alterations thereto.

I claim:

1. In a single handle mixing faucet, a hollow stem, inlet and outlet means in said stem, a sleeve having hot and cold water inlet openings and at least one water discharge opening, said stem being positioned within and rotatable and reciprocal relative to said sleeve to control the volume and temperature of water flowing from said inlet openings to the discharge opening, seal means between said stem and sleeve, a retainer for holding said stem and sleeve, hot and cold water inlet openings adjacent one end of said retainer, passage means between the exterior of said sleeve and interior of the retainer in alignment with the retainer hot and cold water inlet openings for connecting the retainer and sleeve inlet openings, said passage means including seal means, and discharge means in said retainer.

2. The structure of claim 1 further characterized in that the sleeve discharge opening is positioned generally midway between said sleeve inlet openings.

3. The structure of claim 2 further characterized in that said sleeve inlet openings are generally diammetrically opposed.

4. The structure of claim 1 further characterized in that said passage means includes a groove on the exterior surface of said seal means.

5. The structure of claim 1 further characterized in that said discharge means includes a discharge opening in the bottom of said retainer and passage means on the exterior of said sleeve connecting said retainer discharge opening and said sleeve discharge opening.

6. The structure of claim 5 further characterized by and including a second discharge opening in the sleeve, and passage means adjacent said second discharge opening in communication with said retainer discharge opening.

7. The structure of claim 6 further characterized in that said discharge passage means includes grooves on the exterior of said sleeve.

8. The structure of claim 6 further characterized in that said sleeve discharge openings are generally diammetrically opposed and generally midway between adjacent sleeve inlet openings.

9. The structure of claim 1 further characterized by and including outwardly-extending projections on said sleeve and mating recesses on said retainer for insuring proper alignment between the retainer and sleeve.

10. The structure of claim 1 further characterized by and including a side discharge opening in said retainer, external passage forming means on said sleeve connecting said side discharge opening and said sleeve discharge opening.

11. The structure of claim 1 further characterized by and including a pair of oppositely disposed discharge passages on the exterior of said sleeve, said discharge passages being generally midway between the inlet passages on the sleeve exterior.

12. The structure of claim 1 further characterized in that said sleeve extends substantially outwardly beyond said retainer at one end thereof.

13. The structure of claim 12 further characterized by and including handle means connected to said stem and extending about said sleeve.

14. The structure of claim 13 further characterized by and including cooperating means on the sleeve and retainer for preventing relative rotation therebetween.

15. The structure of claim 13 further characterized by and including a nut extending about said sleeve and releasably engaged with said retainer for attaching the stem and sleeve to the retainer.

16. The structure of claim 15 further characterized by and including a cap extending about a portion of said sleeve and positioned outside of said retainer, with a portion of said cap being seated upon an end of said nut.

17. The structure of claim 16 further characterized by and including a groove in said sleeve and a snap ring positioned in said groove, the lower edge of said snap ring bearing down upon said cap.

18. The structure of claim 17 further characterized by and including a groove in the upper end of said cap, a portion of the handle means being positioned in said groove, the lower edge of said snap ring forming an upper bearing surface for said handle means.

19. The structure of claim 1 further characterized by and including a handle, said handle including a cap attached to the stem and a lever engaged with the sleeve.

20. The structure of claim 19 further characterized by and including a key on an interior surface of said cap, and a keyway on a portion of said lever, with said key and keyway cooperating to prevent relative rotation between said cap and lever.

21. The structure of claim 20 further characterized in that a portion of said lever is positioned within said cap, said lever portion being generally semicircular in configuration, with said keyway being generally adjacent one end of said semicircular portion.

22. A seal construction for use in a valve having a hollow stem rotatable and reciprocal within a hollow sleeve and a retainer supporting the stem and sleeve, said seal construction a seal having including port seal portions adapted to extend through ports in the sleeve, said port seal portions having inner rims adapted to be in sealing contact with the exterior of the stem, exterior grooves on said seal for forming water passages between the retainer and the sleeve, portions of said seal adapted to be in sealing contact with the interior of the retainer, the exterior of the sleeve and the exterior of said stem.

23. The structure of claim 22 further characterized in that said seal is made up of two substantially identical parts.

24. The structure of claim 22 further characterized in that portions of said seal, adjacent said exterior grooves, are adapted to be in sealing contact with the interior of the retainer.

* * * * *